United States Patent
Shu et al.

(10) Patent No.: US 7,560,884 B2
(45) Date of Patent: Jul. 14, 2009

(54) ELECTRONIC BRAKING AND ENERGY RECYCLING SYSTEM ASSOCIATED WITH DC BRUSHLESS MOTOR

(75) Inventors: Ying-Haw Shu, Taipei (TW); Kuo-Ming Lee, Taipei (TW); Bin-Yen Ma, Taipei (TW)

(73) Assignee: Wiz Energy Technology Co., Ltd, Taipei (TW)

( * ) Notice: Subject to any disclaimer, the term of this patent is extended or adjusted under 35 U.S.C. 154(b) by 86 days.

(21) Appl. No.: 11/746,077

(22) Filed: May 9, 2007

(65) Prior Publication Data

US 2007/0267988 A1 Nov. 22, 2007

(30) Foreign Application Priority Data

May 16, 2006 (TW) .............................. 95117204 A

(51) Int. Cl.
*H02P 3/14* (2006.01)
(52) U.S. Cl. ...................................... 318/376; 318/375
(58) Field of Classification Search .................. 318/375, 318/376

See application file for complete search history.

(56) References Cited

U.S. PATENT DOCUMENTS

| | | | |
|---|---|---|---|
| 3,737,751 A * | 6/1973 | Lima | 318/463 |
| 4,306,179 A * | 12/1981 | Whitford | 318/139 |
| 6,680,598 B2 * | 1/2004 | Galbiati et al. | 318/717 |
| 7,245,096 B2 * | 7/2007 | Echazarreta | 318/400.01 |

* cited by examiner

*Primary Examiner*—Walter Benson
*Assistant Examiner*—Renata McCloud
(74) *Attorney, Agent, or Firm*—Ming Chow; Sinorica, LLC

(57) ABSTRACT

An electronic braking and energy recycling system associated with a direct current (DC) brushless motor, characterized in that when an electronic braking task is launched, a phase voltage occurred in an inverse mode is applied onto a motor coil corresponding thereto and a gate voltage signal with positive and negative cycles is used to control an upper-side and lower-side branches to switch as compared to each other in the system, so as to redirect a current flown through the motor back to a power source end. In this invention, a controllable inverse torsion is achieved, enabling an electrical machine to be braked smoothly and reliably when necessary. As such, a dynamic power of the motor can be recycled at a maximum rate and thus the purpose of energy recycling is achieved. In addition, no complex circuitry configuration owing to the multi-phase coils is required.

2 Claims, 5 Drawing Sheets

ELECTRONIC BRAKING AND ENERGY RECYCLING SYSTEM ASSOCIATED WITH DC BRUSHLESS MOTOR

BACKGROUND OF THE INVENTION

1. Field of the Invention

The present invention relates to an electronic braking and energy recycling system associated with a direct current (DC) brushless motor, which can achieve a controllable inverse torsion or damping force, for motor braking by using a set of specially defined simple gate signals. Particularly, this present invention can obtain a theoretically maximum recycling proportion of a dynamic power, without the need of altering any hardware structure of the conventional system of this kind.

2. Description of the Prior Art

Earlier electronic brake systems are all developed for the electrical products requiring a constant speed control, such as medical scooter and electro-trailer used in market or factory. All these electrical machines are typically requested with a safe and reliable electronic speed-control mechanism. In this regard, how to provide such electrical products with a smooth and reliable friction in a brake task is a the key point to the electrical products themselves. An electricity-activated vehicle is expected to have good ability in continuous work provided as the promotion of the electronic and electrical technologies increase. That is because a direct current (DC) motor can be used simultaneously for converting an electrical energy into a dynamic power and converting a dynamic power into an electrical energy by a dynamoelectric mechanism. To approach this goal, the efficiency of the energy using in the vehicle becomes to be the key point in the future research. Therefore, how to make the dynamic power efficiently conversed into electrical energy, which can be then restored back to a battery, as braking the vehicle via the same DC brushless motor is apparently an essential issue for the current research and development.

A DC brush motor has the advantages of easy control, owing to the only one set of equivalent internal windings, and lower cost of a controller thereof although it has the problem of powder dust resulted from a carbon brush and a carbon brush resistance. In the recent years, the high power metal oxide semiconductor field effect transistor (MOSFET) is capable of controlling the electrical energy at a relatively higher efficiency as the development of the power electronics. Thus, the electronic braking is not solely aimed at providing the friction needed during speed decreasing of the vehicle. At this time, the electronic braking system is expected to become a subject in the field of the reliable and high efficient DC brushless motor.

However, most of the current electromechanical systems are still built with the DC brush motor, considering that the smooth and reliable speed control can be supported by the simple control criterion in the DC brush system. The way the braking system of the DC brush motor works can be referred to FIG. 1, FIG. 2 and FIG. 3. Since only a single equivalent coil exists within the DC brush motor, the direction of a torsion of the motor is determined by the direction of the electrical current flown through this single coil. The direction of the electrical current flown through the coil, i.e. the direction of the torsion of the motor, can be readily determined by the switch-on/off states of the four MOSFETs shown in FIG. 1. Since an induced voltage on the equivalent coil of the motor is approximately proportional to a rotation speed of the motor, the induced voltage of the motor is relatively larger as the vehicle braked from a high speed, and even equals to the battery voltage as under the maximum motor speed. In this mode, turning on any lower-side MOSFET will makes the induced voltage magnetizing the inductor of this equivalent coil. Moreover, as the lower-side MOSFETs are turned off, an induced electromotive force produced by the magnetized inductor will force the inertial current to flow through the body diodes of the MOSFETs, forwarding the electrical energy back to the electrical power side. When the motor is at the lower speed mode, the induced voltage on the motor coil is also relatively lower ($\epsilon\_motor \times \Delta t\_ON = L\_motor \times \Delta i\_motor$), making the above mechanism incapable of providing a sufficient torsion for braking of the vehicle. Thus, an inverse current has to be initialized so as to obtain sufficiently inverse torsion. Therefore, such an electronic braking mechanism is a sort of wasting electronic energy to resist the motor rotation. Due to the added current with the same direction as the one of the induced electromotive force, the current flown through the windings increases very quickly and there is no sufficient releasing duty for both of the electrical energy from the power system and the induced voltage from the rotating motor. Furthermore, the increased range of the inverse torsion has to be carefully controlled and the mechanic braking system has to be suitably provided, so that the electro-activated vehicle would not move backwards during braking. In light of the above, the conventional electronic brake system does not consider the issue of energy recycling but only aims to the efficient control of the electrical machine. Thus, the conventional brush control system can only provide the braking function without appropriately saving the supplied electrical energy.

With related to the operation of the conventional DC brushless motor, it is referred to in FIG. 4. As shown, the motor has three-phase windings, which are inherently difficult to be used for electronic braking or energy recycling. The motor can be traditionally considered as an inductor on which an induced voltage presents, which reflects the rotation speed of the motor. Theoretically, it is possible to switch between the solid switch-relay or other electronic switch, such as MOSFET and BJT, so that the dynamic power can be redirected back to the battery corresponding to the induced voltage or a super capacitor. In this way, it is operated by restoring the dynamic power back to the electrical energy and controlled only based on the detected induced voltage. Thus, complexity for control can be truly reduced and the current between the phases of the motor can be theoretically exempted from being out of control and thus from burning down the whole system. However, it is not allowable for any capacity difference between cell individuals of the battery. On the other hand, in the case of the super capacitor, a boost converter is required for boosting of the DC voltage accepted at the power end. At this time, not only a conversion efficiency of the electrical energy has to be considered, but also an additional circuitry is required.

Considering applying the control mechanism of the DC brush motor onto the DC brushless motor, the control mechanism is likely to be those shown in FIG. 5 and FIG. 6. Miserably, the same problems are also encountered. For example, the different control mechanisms correspond to the induced voltages associated with high and low speeds have to be provided concurrently. In the low speed mode, the torsion increases dramatically, resulting in a low proportion of energy recycling. At this time, the braking function can only be achieved by resorting to a mechanical design. At the same time, a bi-directional current sensor has to be built to detect the magnitude of the inverse current flown through the coil. More importantly, this braking mechanism can only be effective under the situation where the other two phases of the motor does not produce any other induced current owing to the induced voltage of the subject phase and thus interfere the control mechanism as previously designed.

Therefore, there are still many problems to be overcome in the conventional technology.

In light of the above mentioned problems and shortcoming, the inventor of the present invention sets forth, after years of research effort, an electronic braking and energy recycling system associated with a DC brushless motor.

SUMMARY OF THE INVENTION

The present invention discloses an electronic braking and energy recycling system associated with a direct current (DC) brushless motor, which can particularly achieves a controllable inverse torsion or damping force for motor braking by using a set of simple gate signals with positive and negative cycles for controlling operations of respective MOSFETs on upper and lower-side branches (six combinations in total), which is not interfered by multi-phase coils, and thus obtains a maximum proportion of dynamic power recycling, without the need of altering any of a hardware structure of the conventional system.

In accordance with the present invention, the electronic braking and energy recycling system associated with direct current (DC) brushless motor is characterized in that when an electronic braking task is launched, a phase voltage occurred in an inverse mode is applied onto a motor coil corresponding thereto and a gate voltage signal with positive and negative cycles is used to control an upper-side and lower-side branches to switch, so as to redirect a current flown through the motor back to a power source end. In this invention, a controllable inverse torsion is achieved, enabling an electrical machine to be braked smoothly and reliably when necessary. As such, the dynamic power of the motor can be recycled at a maximum rate and thus the purpose of energy recycling is achieved. In addition, no complex circuitry configuration owing to the multi-phase coils is required.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

The present invention discloses an electronic braking and energy recycling system associated with DC brushless motor, which can provide an inverse torsion-based braking function by using a conversion of a gate voltages under the condition without altering the conventional motor controller and any hardware configuration of the motor. Further, the inventive system can achieve the maximum recycling ratio for the dynamic power of the motor without being interfered with the multi-phase coil.

Figure 1:
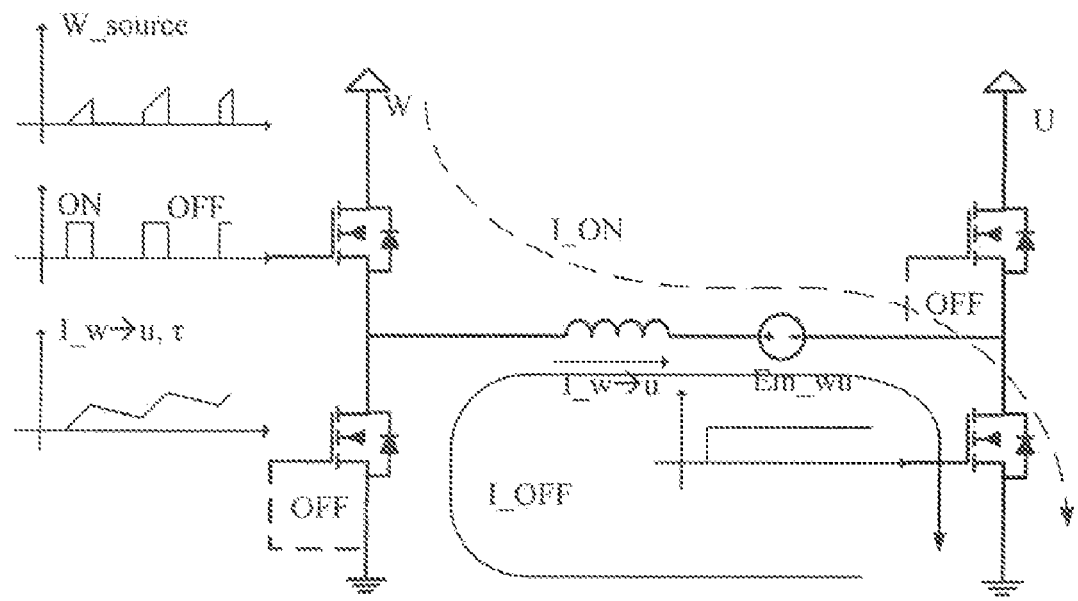
FIG. 1 is a schematic diagram illustrating a current occurred when a dynamic power is derived from a prior art direct current (DC) brush controller.
Figure 2:
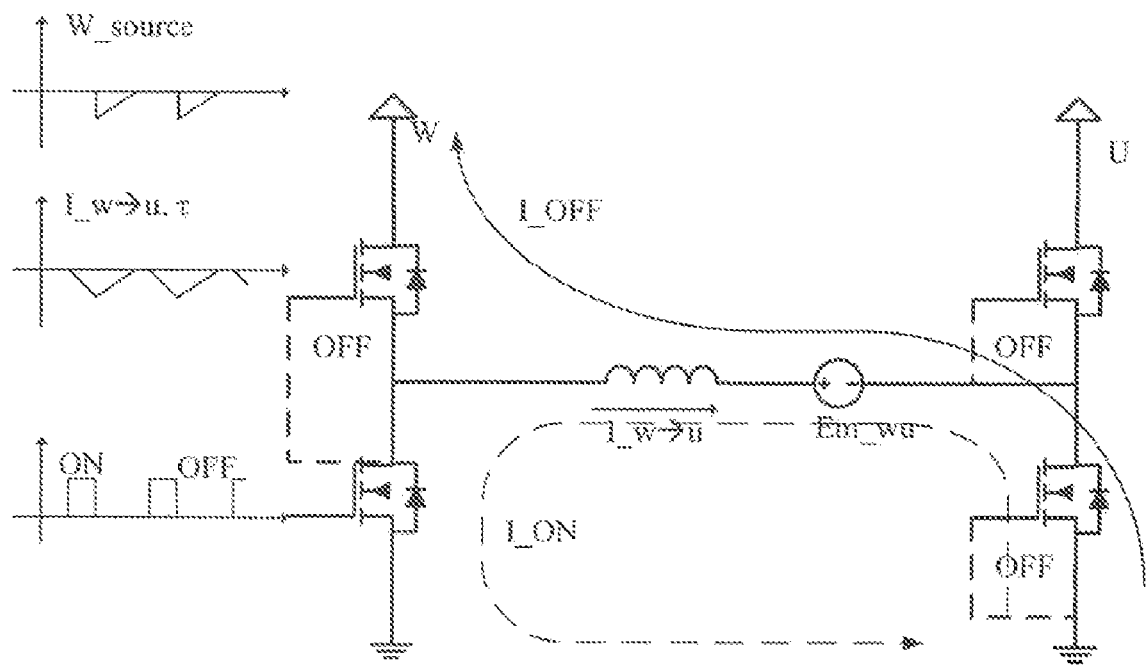
FIG. 2 is a schematic diagram illustrating how an inverse torsion is outputted from the DC brush controller when operated under a high speed by switching a direction of the current with a lower-side thereof.
Figure 3:
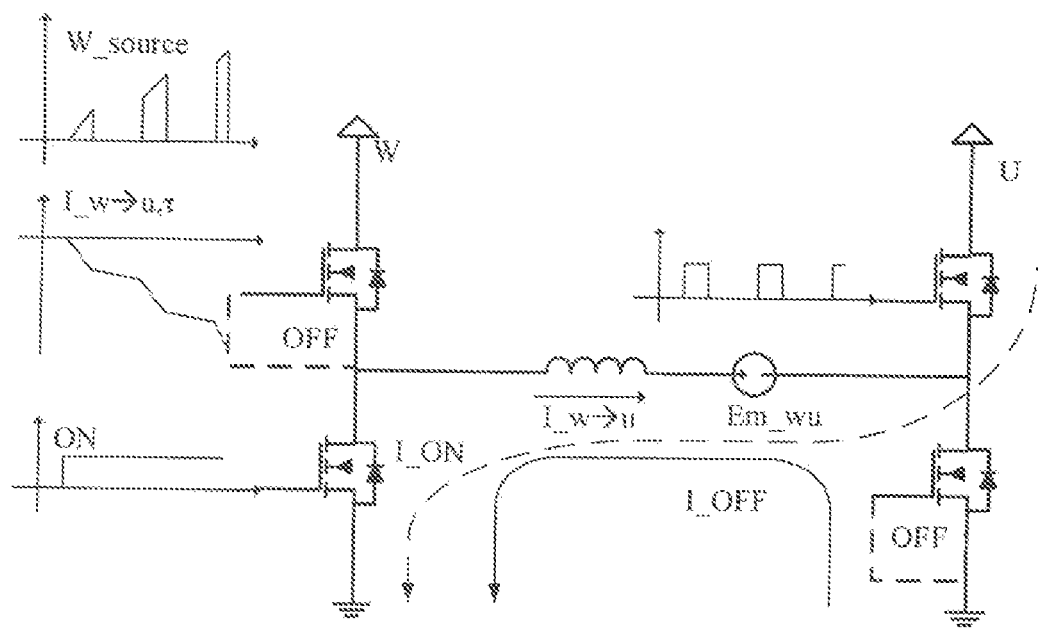
FIG. 3 is a schematic diagram illustrating how an upper-side branch of the DC brush controller is used to switch the direction of the current when operated at a low speed.
Figure 4:
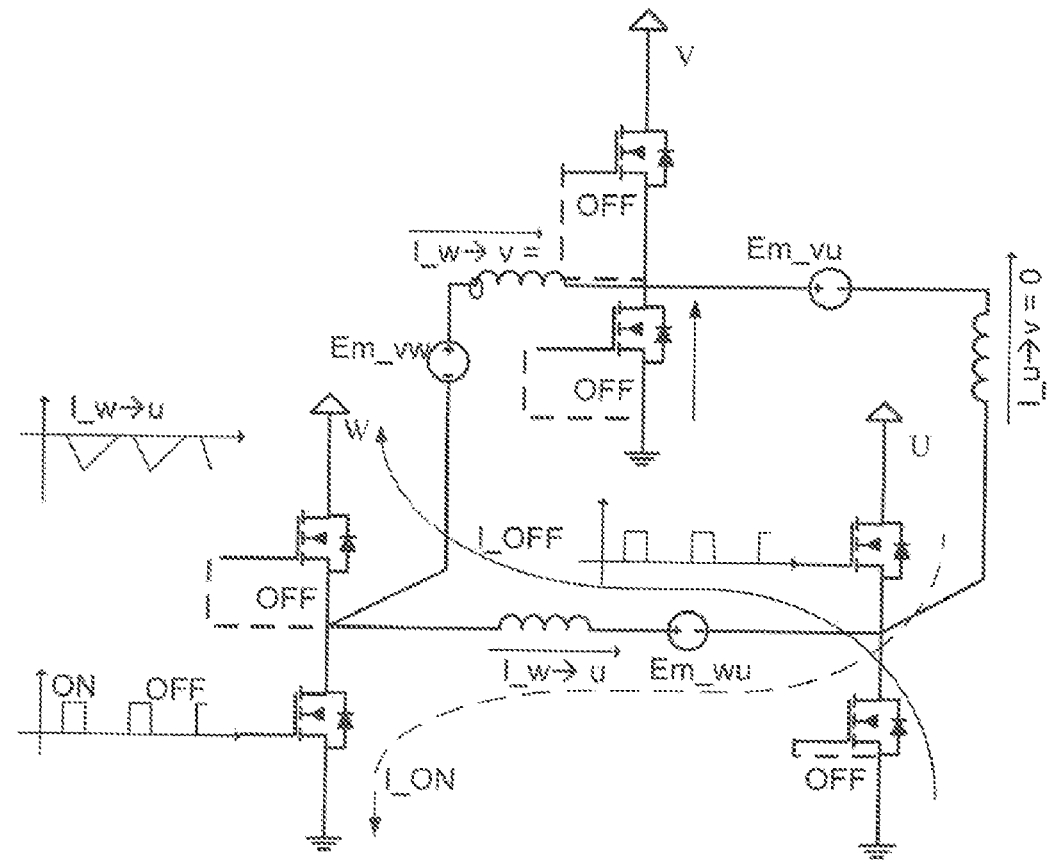
FIG. 4 is a schematic diagram of the direction of the current occurred when the dynamic power is derived from the DC brush controller (another two phases both correspond to a cut-off state)
Figure 5:
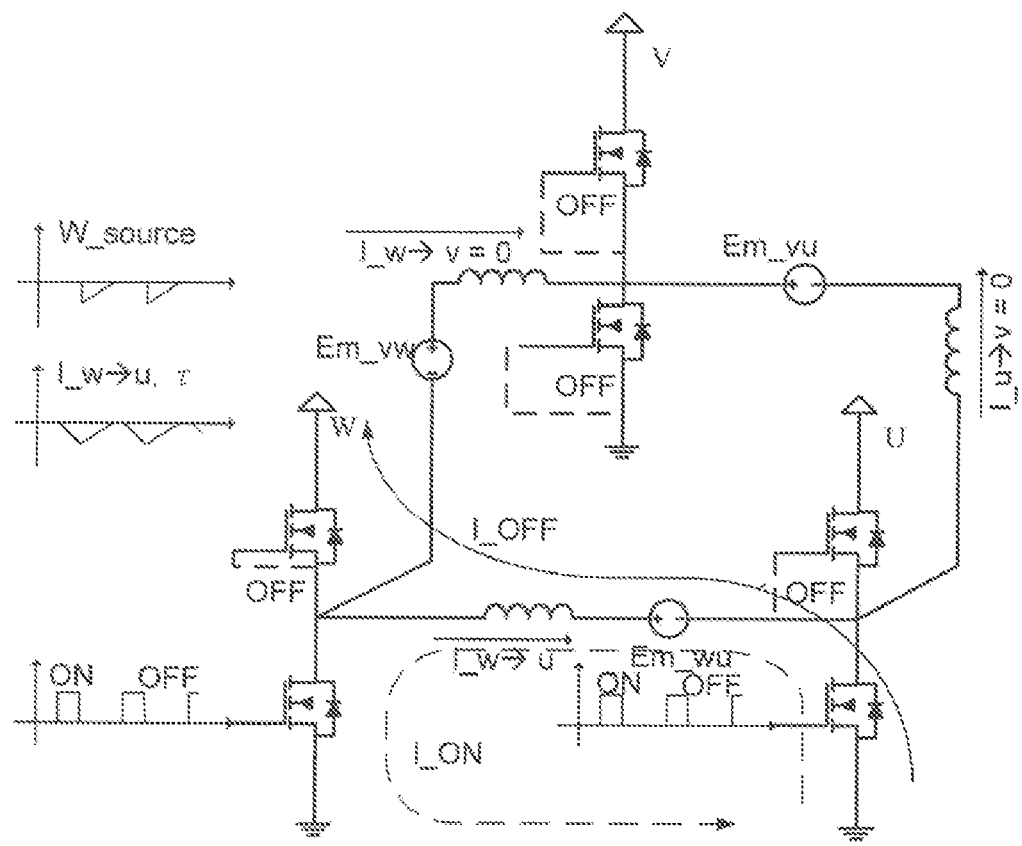
FIG. 5 is a schematic diagram illustrating how the lower-side branch of the DC brush controller is used to switch the direction of the current when operated under a high speed.
Figure 6:
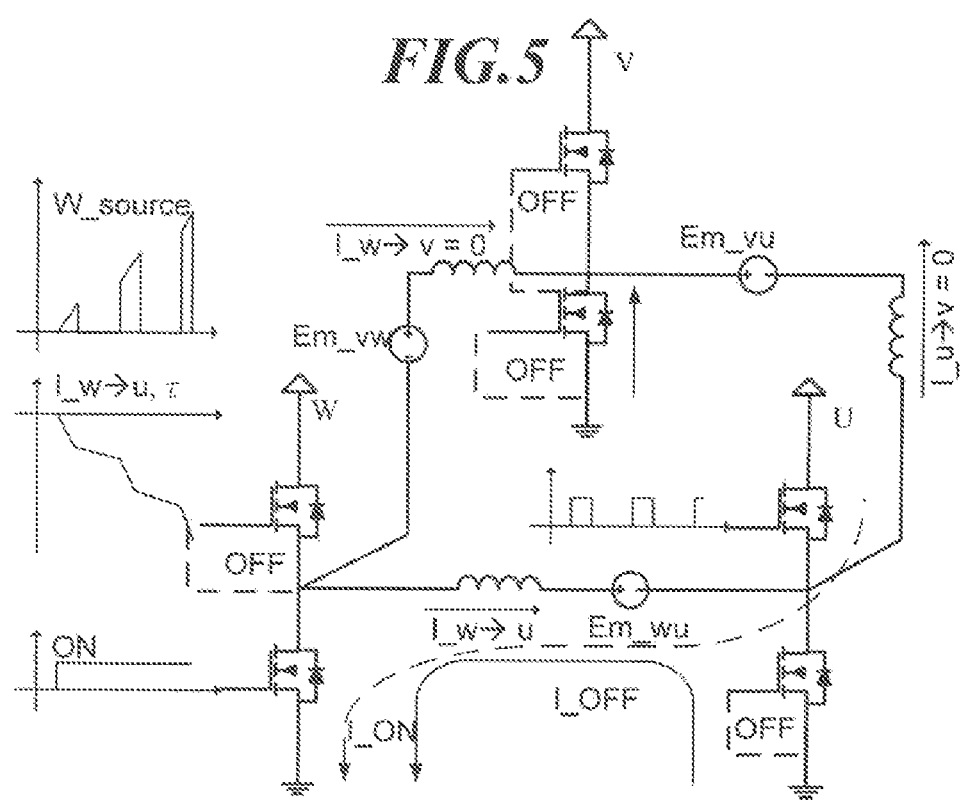
FIG. 6 is a schematic diagram illustrating how the upper-side branch of the DC brush controller is used to switch the direction of the current when operated at a low speed according to the present invention.
Figure 7:
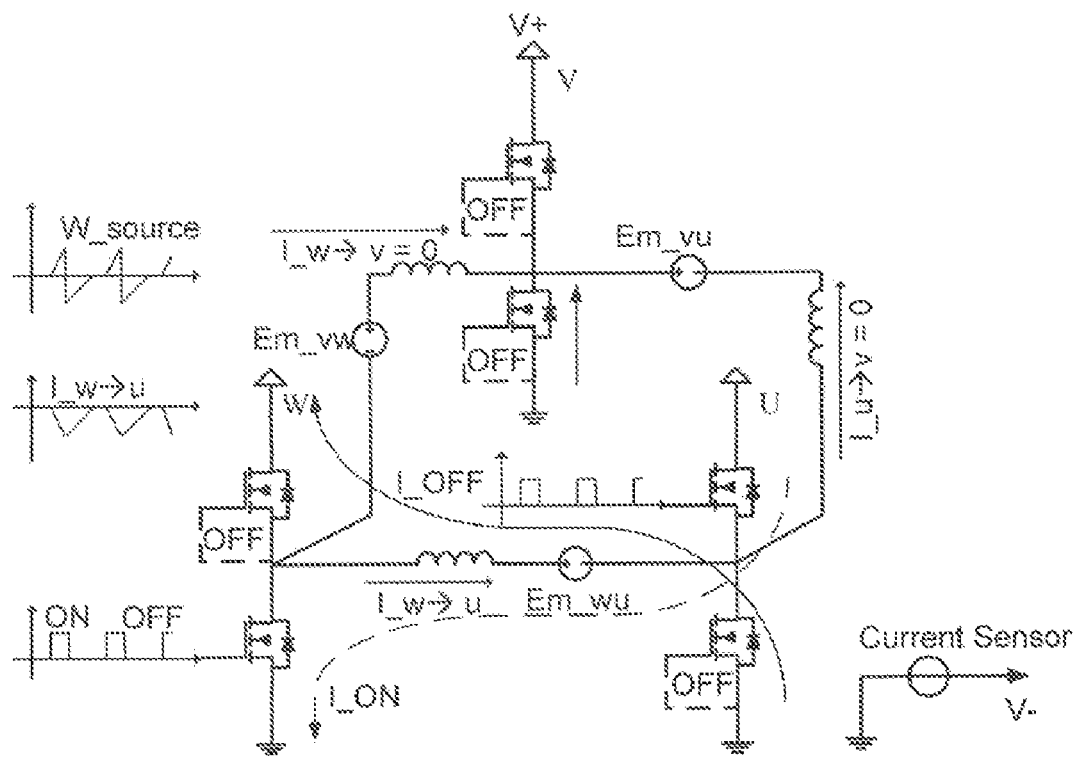
FIG. 7 is a schematic diagram illustrating how an upper and lower-side branches are inversely switched to control the direction of the current according to the present invention.

Referring to FIG. 7, the DC brushless motor is shown therein, in which a current is shown as flowing through a coil of the motor with the flow direction thereof also indicated. When the electronic braking system is launched, a controller applies a voltage associated with an inverse mode onto the indicated motor coil. At this time, the current flown through the motor coil has the relationship with other parameters related to the motor (Voltage-Time Law: $V\_motor \times \Delta t\_ON = L\_motor \times \Delta i\_motor$):

$$(\epsilon_{motor} + V_{source}) \times \Delta t_{ON} = L_{motor} \times \Delta i_{motor} \qquad (1)$$

As compared to the prior art, the only difference is that a MOSFET on a lower-side branch at the left part is not always maintained in "ON" status. Instead, the mentioned MOSFET on the lower-side branch is operated in a synchronous switching state with a MOSFET on an upper-side branch at the right part. In this manner, the current flown through the motor coil can be redirected back to a power end as the MOSFETs of the upper and lower-side branches are turned off.

In the case of an electrical machine operating in a high speed or a system requiring a small torsion, when it is braked, the motor coil restores the current flown therethrough back to a zero-current state. That is, the electrical machine or system is operated in the so-called "zero-current switching state". In the turn-off cycle, the Voltage-Time Law is:

$$V_{source} \times \Delta t_{\to Zero} = L_{motor} \times \Delta i_{motor} \qquad (2)$$

Since the current is each time restored back to the zero-current state, a ratio of the turn-on time to the turn-off time can be represented as:

$$\frac{\Delta t_{ON}}{\Delta t_{\to Zero}} = \frac{V_{source}}{(V_{source} + \varepsilon_{motor})}. \qquad (3)$$

On the other hand, since an electrical power consumption associated with the current i is 0.5×V_source×Δi_motor×Δt, a ratio of recycled energy recycling to supplied energy is:

$$\frac{(V_{source} + \varepsilon_{motor})}{(V_{source})} = 1 + \frac{\varepsilon_{motor}}{V_{source}}. \qquad (4)$$

In the case of an electrical machine operating in a low speed or a system requiring a large torsion, when it is braked, the motor coil enters a continuous state rather than the zero-current state. At this time, a duty time of the braking task is:

$$\text{Duty} = \Delta t_{ON}/(\Delta t_{ON} + \Delta t_{OFF}) \qquad (5)$$

and the Voltage-Time Law is then:

$$(\varepsilon_{motor} + V_{source}) \times \text{Duty} \times \Delta t = L_{motor} \times \Delta i_{motor} \qquad (6)$$

and $$(\varepsilon_{motor} - V_{source}) \times (1 - \text{Duty}) \times \Delta t = L_{motor} \times \Delta i_{motor} \qquad (7)$$

Under momentary consideration, since a variation of the current in each cycle is approached to zero, the duty time can be rewritten as:

$$\text{Duty} \approx \frac{(V_{source} - \varepsilon_{motor})}{2 \times V_{source}}, \text{ and} \qquad (8)$$

$$(1 - \text{Duty}) \approx \frac{(V_{source} + \varepsilon_{motor})}{2 \times V_{source}}. \qquad (9)$$

At this time, the electrical power is the same as that associated with the above case 0.5×V_source×Δi_motor×Δt. Accordingly, the ratio of recycled energy and supplied energy is:

$$\frac{(V_{source} + \varepsilon_{motor})}{(V_{source} - \varepsilon_{motor})} = 1 + \frac{2 \times \varepsilon_{motor}}{(V_{source} - \varepsilon_{motor})}. \qquad (10)$$

According to Eqs. (4) and (10), the ratio of recycled energy and supplied energy is certainly greater than one and considerably increases as the induced electromotive force increases, meaning that such electronic braking mechanism truly provides an energy recycling function without the problem of electrical loss resulting from the braking task.

Figure 8:
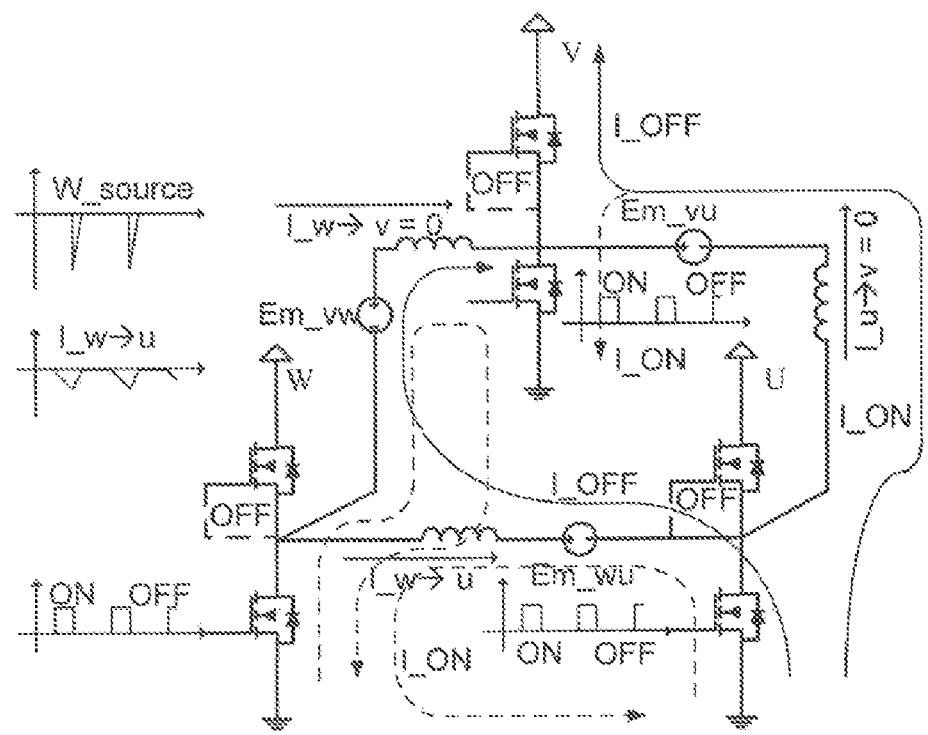
FIG. 8 is a schematic diagram illustrating how the DC brushless controller operates when the upper and lower-side branches are inversely switched, considering currents on three phases according to the present invention.

In a rotating brushless motor, there are six possible sets of coil phases (positive and negative voltages) relationships, including the one shown in FIG. 8. As shown in FIG. 8, since the upper-side branch at the right end and the lower-side branch at the left end switch synchronously, the induced voltages of the other two coils do not affect the operation of the control mechanism.

Figure 9:
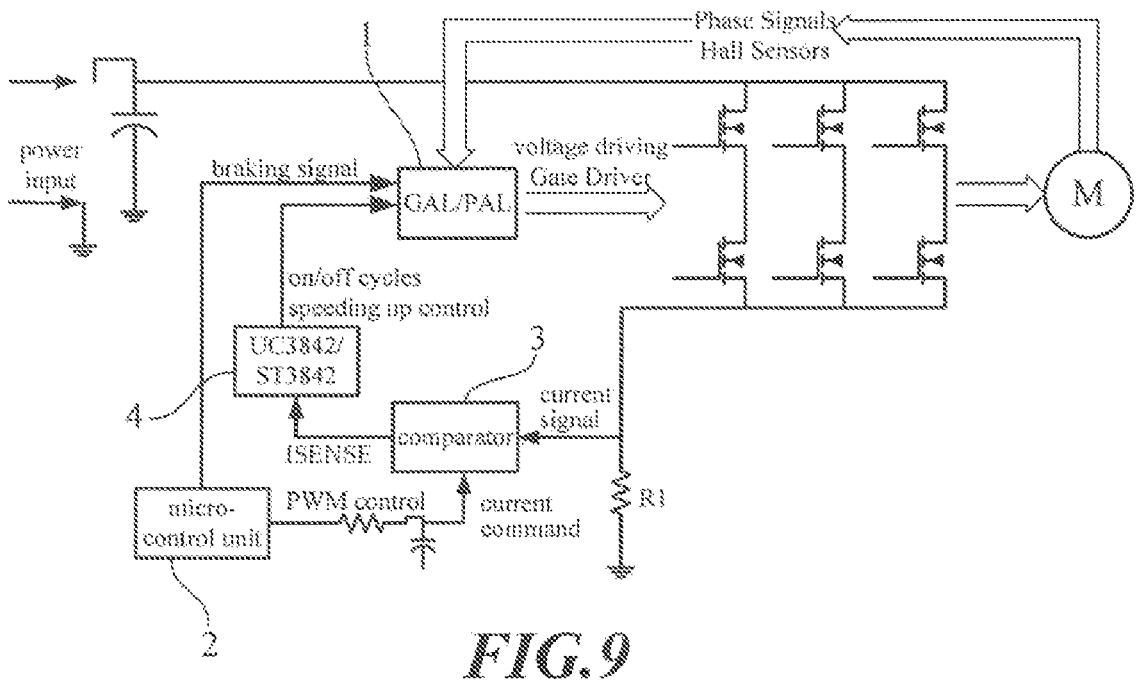
FIG. 9 is a schematic diagram illustrating how the electronic braking control is achieved by using simple gate array logics according to an embodiment of the present invention.

Referring to FIG. 9, in which the electronic braking and energy recycling system according to an embodiment of the present invention is depicted. As shown in FIG. 9, the system embodiment is a simple example of use thereof. The basic structure of this embodiment is obtained from the patents TW251395 and U.S. Pat. No. 6,960,896, except that the braking function is implemented by the signals for emergent stop used in these two patents. Logic gate 1 (gate array logic, GAL) is here used for signal decoding. Logic gate 1 is also used to provide accurate phase signals associated with the three-phase upper and lower-side branches when a braking signal is inputted. A micro-control unit 2 is configured to converse a torsion command into a current command and monitor a safety issue of the system by using a power control technology. A simple shunt is use to converse the current signal into a voltage signal. This voltage signal is then amplified and transmitted to a comparator 3. Finally, an output from the comparator 3 is forwarded to a current mode pulse width modulation (PWM) controller, ST3842, 4, in which the output from the comparator 3 is served as a reference for a PWM process.

Figure 10:
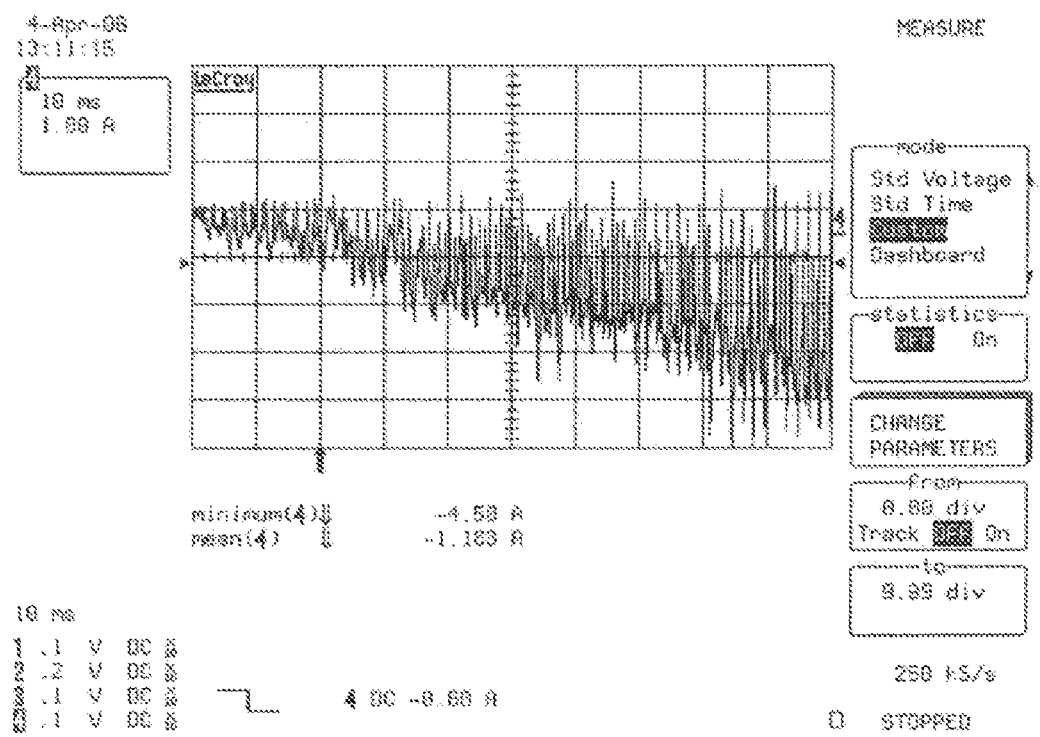
FIG. 10 is a schematic diagram of a current waveform as recycled obtained from the above embodiment according to the present invention.

FIG. 10 is a schematic diagram of a current waveform as recycled obtained from the embodiment shown in FIG. 9. In this drawing, the positive current means the current is flowed from the power source to the electrical system and thus an energy output, while the negative current means the current is flowed from the electrical system to the power source and this an energy recycling. It can be appreciated that the proportion of the energy recycling is almost a constant value when the motor rotates at a constant speed.

These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying FIGS. and drawings.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

What is claimed is:

1. An electronic braking and energy recycling system of a DC (direct current) brushless motor comprising,
    means for launching an electronic braking task wherein a phase voltage occurred in an inverse mode is applied onto a motor coil corresponding thereto, and a gate voltage signal with positive and negative cycles is used to control an upper-side and lower-side branches to switch, so as to redirect a current flown through the motor back to a power source end;
    means for achieving a maximum recycling ratio for dynamic power of the motor without being interfered with the motor coil;
    means for the motor coil restoring the current flown back to a zero-current state when the motor is operated in a high speed or the motor requires a small torsion;
    means for the motor coil operating with the current in a continuous state when the motor is operated in a low speed or the motor requires a large torsion;
    means for signal decoding;
    means for converting a torsion command into a current command;
    means for converting the current signal into a voltage signal;
    means for amplifying the voltage signal and transmitting the voltage signal to a comparator; and
    means for forwarding an output from the comparator to a current mode pulse width modulation controller.

2. The electronic braking and energy recycling system of a DC brushless motor as claimed in claim 1, wherein the gate voltage signal is applied onto a set of MOSFETs on the upper-side and lower-side operating synchronously.

* * * * *